(12) United States Patent
Tanaka et al.

(10) Patent No.: US 8,141,335 B2
(45) Date of Patent: Mar. 27, 2012

(54) INTAKE AIR HEATING CONTROL DEVICE FOR GAS TURBINE

(75) Inventors: Satoshi Tanaka, Takasago (JP); Shoichi Harada, Takasago (JP); Kozo Toyama, Takasago (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 448 days.

(21) Appl. No.: 12/447,382

(22) PCT Filed: Nov. 9, 2007

(86) PCT No.: PCT/JP2007/071758
§ 371 (c)(1),
(2), (4) Date: Jun. 9, 2009

(87) PCT Pub. No.: WO2008/062678
PCT Pub. Date: May 29, 2008

(65) Prior Publication Data
US 2010/0071372 A1 Mar. 25, 2010

(30) Foreign Application Priority Data
Nov. 21, 2006 (JP) .................................. 2006-313758

(51) Int. Cl.
*F02C 7/047* (2006.01)
*F02C 7/08* (2006.01)
(52) U.S. Cl. ..................................... 60/39.093; 60/39.24
(58) Field of Classification Search ............... 60/39.093, 60/726, 39.23, 794, 795, 39.24
See application file for complete search history.

(56) References Cited

U.S. PATENT DOCUMENTS

| | | | |
|---|---|---|---|
| 4,428,194 A * | 1/1984 | Stokes et al. ..................... | 60/779 |
| 6,233,917 B1 | 5/2001 | Bahr et al. | |
| 2003/0093184 A1 * | 5/2003 | Tanaka .......................... | 700/289 |
| 2004/0045275 A1 * | 3/2004 | Tanaka ........................ | 60/39.281 |
| 2006/0005526 A1 * | 1/2006 | Tanaka et al. ................ | 60/39.27 |
| 2006/0117757 A1 * | 6/2006 | Tanaka et al. .................... | 60/772 |

FOREIGN PATENT DOCUMENTS

| | | |
|---|---|---|
| JP | 4-48921 B2 | 8/1992 |
| JP | 9-317496 A | 12/1997 |
| JP | 2003-161164 A | 6/2003 |

OTHER PUBLICATIONS

International Search Report of PCT/JP2007/071758, date of mailing Feb. 5, 2008.

* cited by examiner

*Primary Examiner* — Ted Kim
(74) *Attorney, Agent, or Firm* — Westerman, Hattori, Daniels & Adrian, LLP

(57) ABSTRACT

Extremely cold (e.g., −20° C.) air A is heated by a heat exchanger 30, which is supplied with steam S via a control valve 32, and heated air A' is taken into a gas turbine 10. The valve opening degree of the control valve 32 is feedback-controlled so that the deviation between the measured temperature t1 and the target temperature TO of the heated air A' is eliminated. Further, when the number of revolutions, N, of the gas turbine 10 increases, or when an IGV opening degree OP increases, the valve opening degree of the control valve 32 is feedforward-controlled in accordance with the increase in the number N of revolutions or the increase in the IGV opening degree OP. By so doing, the temperature of air A' can be maintained at a temperature enabling stable combustion without delay in control, and intake air can be heated without delay in control, even at the start of the gas turbine or during change in the opening degree of an inlet guide vane.

3 Claims, 3 Drawing Sheets

INTAKE AIR HEATING CONTROL DEVICE FOR GAS TURBINE

TECHNICAL FIELD

This invention relates to an intake air heating control device for a gas turbine, which is designed to be capable of raising the temperature of intake air with good responsiveness, even during operation subject to a great change in the amount of intake air.

BACKGROUND ART

In a gas turbine installed in a cold district, air taken in from the atmosphere is heated, and then let into the gas turbine.

This is because if high-density outside air (air) at an extremely low temperature (e.g., −20° C. to −30° C.) is taken, unchanged, into the gas turbine, ignition performance lowers or combustion vibration occurs, making it impossible to ensure the stable combustion of the gas turbine. If such air at the extremely low temperature is taken in, moreover, water in air may freeze into ice at the inlet of the gas turbine. The resulting ice may enter the gas turbine, damaging the turbine blade or the like.

In the gas turbine installed in the cold district, therefore, air is heated by a heating device, such as a heat exchanger, and then taken into the gas turbine. In this case, air is heated so that the air temperature reaches a temperature at which the gas turbine can perform stable combustion (e.g., a temperature of the order of +5° C.).

FIG. 3 shows an example of a gas turbine plant installed in a cold district. As shown in this drawing, a gas turbine 10 is composed of a compressor 11, a combustor 12, and a turbine 13 as main members. Air (atmosphere) A let in from the outside is taken into the compressor 11 of the gas turbine 10 via an air intake duct 15.

An inlet guide vane (IGV) 11a is provided at the inlet of the compressor 11, and the amount of air taken into the compressor 11 is controlled according to the opening degree of the IGV 11a. The opening degree of the IGV 11a is controlled according to the status of load, the operating state, etc.

An electric generator 20 is connected to the gas turbine 10, and is rotationally driven by the gas turbine 10 to generate electricity.

A heat exchanger 30 for heating intake air is interposed in the air intake duct 15. The heat exchanger 30 is supplied with steam S at a high temperature (e.g., 300° C.) via a steam pipe 31. The heat exchanger 30 heats (exchanges heat with) air A, which is taken into the gas turbine 10, by the heat of the supplied steam S.

In the steam pipe 31, a control valve 32 is interposed for controlling the amount of steam flowed through the steam pipe 31, namely, the amount of steam to be supplied to the heat exchanger 30.

As the steam supplied to the heat exchanger 30, there is used steam produced from an auxiliary steam boiler (not shown), or steam produced from a waste heat boiler (not shown) which generates steam by utilizing the waste heat of the turbine 13.

In the air intake duct 15, a thermometer 40 is mounted at a position between the heat exchanger 30 and the inlet stage of the compressor 11. The thermometer 40 measures the temperature of air A' which has been heated by the heat exchanger 30 and is taken into the compressor 11 of the gas turbine 10. The measured temperature t1 of the intake air A' measured in this manner is fed to a control device 50.

The control device 50 has a deviation computing section 51, and a proportional plus integral computing section (PI computing section) 52. This control device 50 has a target temperature TO (e.g., +5° C.) set beforehand therein. This target temperature TO is a temperature set beforehand according to the characteristics of each gas turbine 10, as the temperature of intake air which enables the gas turbine 10 to combust (operate) stably.

The deviation computing section 51 of the control device 50 computes the deviation between the measured temperature t1 and the target temperature TO to obtain a deviation temperature $\Delta t$ (=TO−t1). The proportional plus integral computing section 52 performs PI computation of the deviation temperature $\Delta t$, and outputs a valve opening degree command P. The valve opening degree of the control valve 32 is adjusted according to the valve opening degree command P.

Thus, when the measured temperature t1 is low, the valve opening degree command P is great, making the valve opening degree of the control valve 32 high to increase the amount of steam which is supplied to the heat exchanger 30. When the measured temperature t1 is high, on the other hand, the valve opening degree command P is small, making the valve opening degree of the control valve 32 low to decrease the amount of steam which is supplied to the heat exchanger 30. After all, the amount of steam which is supplied to the heat exchanger 30 is feedback-controlled so that the temperature of air A' heated by the heat exchanger 30 and taken into the compressor 11 becomes the target temperature TO. By so doing, the temperature of intake air A' is maintained at a temperature which permits stable combustion.

Patent Document 1: JP-B-4-48921
Patent Document 2: JP-A-2003-161164

DISCLOSURE OF THE INVENTION

Problems to be Solved by the Invention

When the gas turbine 10 is started, the amount of air taken into the compressor 11 increases markedly with an increase in the number of revolutions of the gas turbine. By opening the IGV 11a, moreover, the amount of air taken into the compressor 11 is increased markedly.

According to the conventional technologies, simple feedback control has been exercised to control the opening degree of the control valve 32 (namely, control the amount of steam to be supplied to the heat exchanger 30) so that the temperature of air A' to be taken into the compressor 11 becomes the target temperature TO.

Thus, if the amount of air taken into the compressor 11 sharply increases, as at the start of the gas turbine or during the increase in the opening degree of the IGV, the possibility arises that temperature control for rendering the temperature of air A' (measured temperature t1) the target temperature TO does not follow successfully (delay in control occurs), and the temperature of air A' to be taken into the compressor 11 falls markedly, and cannot be maintained at the temperature enabling stable combustion.

This is because with simple feedback control, a control action which eliminates the deviation between the measured temperature t1 and the target temperature TO is started after the actual occurrence of a phenomenon in which the amount of air to be taken into the compressor 11 sharply increases to drop the air temperature sharply. Thus, a great delay in control develops.

If the IGV 11a is closed, on the other hand, the amount of intake air fed into the compressor 11 decreases considerably, with the result that the temperature of air A' to be taken into the compressor 11 rises. This also becomes a factor in combustion instability.

The present invention has been accomplished in the light of the above-described conventional technologies. It is an object of the invention to provide an intake air heating control device for a gas turbine, which can maintain the temperature of intake air at the target temperature and ensure stable combustion, even if the amount of air taken into the compressor 11 abruptly changes, as at the start of the gas turbine 10 or during the increase in the opening degree of the IGV 11a.

Means for Solving the Problems

An aspect of the present invention, intended for solving the above problems, is an intake air heating control device for a gas turbine, comprising:
a heat exchanger for heating air, which is taken into the gas turbine, by a heating medium;
a control valve for controlling an amount of the heating medium, which is supplied to the heat exchanger, by having a valve opening degree thereof controlled;
a thermometer for measuring a temperature of air which has been heated by the heat exchanger and is taken into the gas turbine; and
a control device for controlling the valve opening degree of the control valve so that a measured temperature measured by the thermometer becomes a preset target temperature,
characterized in that the control device comprises
a deviation computing section for obtaining a deviation temperature being a deviation between the target temperature and the measured temperature, and a proportional plus integral computing section for performing proportional plus integral computation of the deviation temperature to obtain a valve opening degree PI correction command P,
a valve opening degree command computing function section for outputting a valve opening degree command whose value increases when a number of revolutions of the gas turbine increases,
an inlet guide vane correction coefficient computing function section for outputting an inlet guide vane correction coefficient whose coefficient value increases when an opening degree of an inlet guide vane of the gas turbine heightens,
a multiplying section for multiplying the valve opening degree command by the inlet guide vane correction coefficient, and outputting a valve opening degree prior command, and
an adding section for adding the valve opening degree prior command to the valve opening degree PI correction command, and outputting a corrected valve opening degree command,
and controls the valve opening degree of the control valve in accordance with a magnitude of the corrected valve opening degree command.

Another aspect of the present invention is an intake air heating control device for a gas turbine, comprising:
a heat exchanger for heating air, which is taken into the gas turbine, by a heating medium;
a control valve for controlling an amount of the heating medium, which is supplied to the heat exchanger, by having a valve opening degree thereof controlled;
a thermometer for measuring a temperature of air which has been heated by the heat exchanger and is taken into the gas turbine; and
a control device for controlling the valve opening degree of the control valve so that a measured temperature measured by the thermometer becomes a preset target temperature,
characterized in that the control device comprises
a deviation computing section for obtaining a deviation temperature being a deviation between the target temperature and the measured temperature, and a proportional plus integral computing section for performing proportional plus integral computation of the deviation temperature to obtain a valve opening degree PI correction command P,
a second deviation computing section for obtaining a temperature difference between the target temperature and atmospheric temperature,
a valve opening degree command computing function section for outputting a valve opening degree command whose value increases when a number of revolutions of the gas turbine increases,
an inlet guide vane correction coefficient computing function section for outputting an inlet guide vane correction coefficient whose coefficient value increases when an opening degree of an inlet guide vane of the gas turbine heightens,
a temperature difference correction coefficient computing function section for outputting a temperature difference correction coefficient whose coefficient value increases when the temperature difference increases,
a multiplying section for multiplying the valve opening degree command by the inlet guide vane correction coefficient and the temperature difference correction coefficient, and outputting a valve opening degree prior command, and
an adding section for adding the valve opening degree prior command to the valve opening degree PI correction command, and outputting a corrected valve opening degree command,
and controls the valve opening degree of the control valve in accordance with a magnitude of the corrected valve opening degree command.

Still another aspect of the present invention is an intake air heating control device for a gas turbine, comprising:
a heat exchanger for heating air, which is taken into the gas turbine, by a heating medium;
a control valve for controlling an amount of the heating medium, which is supplied to the heat exchanger, by having a valve opening degree thereof controlled;
a thermometer for measuring a temperature of air which has been heated by the heat exchanger and is taken into the gas turbine; and
a control device for controlling the valve opening degree of the control valve so that a measured temperature measured by the thermometer becomes a preset target temperature,
characterized in that the control device comprises
a deviation computing section for obtaining a deviation temperature being a deviation between the target temperature and the measured temperature, and a proportional plus integral computing section for performing proportional plus integral computation of the deviation temperature to obtain a valve opening degree PI correction command P,
a second deviation computing section for obtaining a temperature difference between the target temperature and atmospheric temperature,
a valve opening degree command computing function section for outputting a valve opening degree command whose value increases when a number of revolutions of the gas turbine increases,
an inlet guide vane correction coefficient computing function section for outputting an inlet guide vane correction coefficient whose coefficient value increases when an opening degree of an inlet guide vane of the gas turbine heightens,
a temperature difference correction coefficient computing function section for outputting a temperature difference correction coefficient whose coefficient value increases when the temperature difference increases, a heating medium pressure correction coefficient computing function section for outputting a heating medium pressure correction coefficient whose coefficient value becomes 1 when a pressure of the heating medium to be supplied to the heat exchanger is equal to a preset reference pressure, whose coefficient value becomes smaller than 1 when the pressure of the heating medium to be supplied to the heat exchanger is higher than the reference pressure, and whose coefficient value becomes larger than 1 when the pressure of the heating medium to be supplied to the heat exchanger is lower than the reference pressure, a heating medium temperature correction coefficient computing function section for outputting a heating medium temperature correction coefficient whose coefficient value becomes 1 when a temperature of the heating medium to be supplied to the heat exchanger is equal to a preset reference temperature, whose coefficient value becomes smaller than 1 when the temperature of the heating medium to be supplied to the heat exchanger is higher than the reference temperature, and who se coefficient value becomes larger than 1 when the temperature of the heating medium to be supplied to the heat exchanger is lower than the reference temperature, a multiplying section for multiplying the valve opening degree command by the inlet guide vane correction coefficient, the temperature difference correction coefficient, the heating medium pressure correction coefficient, and the heating medium temperature correction coefficient, and outputting a valve opening degree prior command, and an adding section for adding the valve opening degree prior command to the valve opening degree PI correction command, and outputting a corrected valve opening degree command, and controls the valve opening degree of the control valve in accordance with a magnitude of the corrected valve opening degree command.

Effects of the Invention

The amount of intake air is increased in accordance with an increase in the number of revolutions caused by the start of the gas turbine. Alternatively, the amount of intake air is increased or decreased by the opening or closing of the inlet guide vane. In such cases, the present invention exercises prior control (or feedforward control) in the following manner: The amount of the heating medium (steam) is increased or decreased according to the operating conditions for increasing or decreasing the amount of intake air. Because of such prior control, the temperature of intake air can be maintained at a temperature, at which stable combustion is possible, even under the operating conditions causing an abrupt change in the amount of intake air (e.g., at the start of the gas turbine).

It is to be noted that the "heating medium" is not limited to steam, and an exhaust gas or the like can be applied.

DESCRIPTION OF THE NUMERALS

Figure 1:
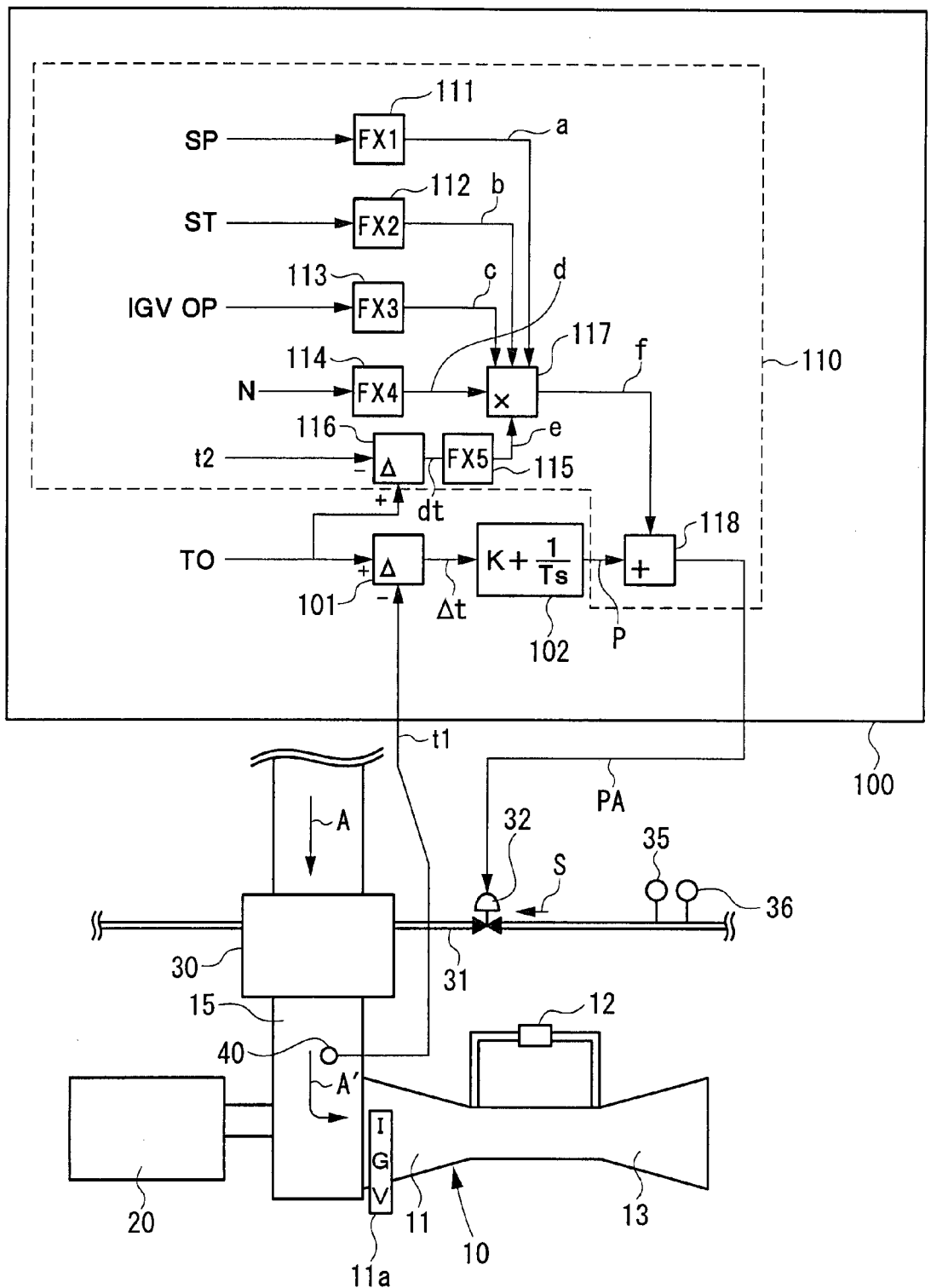
FIG. 1 is a configurational drawing showing an intake air heating control device for a gas turbine according to an embodiment of the present invention.

10 Gas turbine
11a Inlet guide vane
15 Air intake duct
30 Heat exchanger
31 Steam pipe
32 Control valve
35 Pressure gauge
36 Thermometer
40 Thermometer
100 Control device
110 Prior control section

BEST MODE FOR CARRYING OUT THE INVENTION

The best mode for carrying out the present invention will now be described in detail based on an embodiment of the present invention.

Embodiment

FIG. 1 shows a gas turbine plant to which an intake air heating control device for a gas turbine according to the embodiment of the present invention has been applied. In this embodiment, a steam pipe 31 is equipped with a pressure gauge 35 for detecting the pressure of steam S to be supplied to a heat exchanger 30, and a thermometer 36 for detecting the temperature of steam S. Further, a control device 100 for controlling the opening degree of a control valve 32 is provided.

Other portions (e.g., gas turbine 10, electric generator 20, heat exchanger 30, steam pipe 31, control valve 32, etc.) are in the same configurations as in conventional technologies. In the following descriptions, therefore, portions different from those in the conventional technologies will be mainly described, and the same portions as in the conventional technologies will be assigned the same numerals as those in the conventional technologies, with duplicate explanations being omitted.

The control device 100 has a prior control section 110 as well as a deviation computing section 101, and a proportional plus integral computing section 102.

This control device has a target temperature TO (e.g., +5° C.) set beforehand therein. This target temperature TO is a temperature set beforehand according to the characteristics of each gas turbine 10, as the temperature of intake air which enables the gas turbine 10 to combust (operate) stably.

The deviation computing section 101 of the control device 100 computes the deviation between a measured temperature t1 and the target temperature TO to obtain a deviation temperature $\Delta t$ (=TO−t1). The proportional plus integral computing section 102 performs PI computation of the deviation temperature $\Delta t$, and outputs a valve opening degree PI correction command P.

On the other hand, the prior control section 110 has a valve opening degree command computing function section 114, correction coefficient computing function sections 111 to 113 and 115, a deviation computing section 116, a multiplying section 117, and an adding section 118.

The prior control section 110 receives a steam pressure SP showing the pressure of steam S measured by the pressure gauge 35, a steam temperature ST showing the temperature of steam S measured by the thermometer 36, an IGV opening degree OP measured by a sensor (not shown) for detecting the opening degree of IGV 11a, the number of revolutions of the gas turbine (called gas turbine revolution number), N, measured by a sensor (not shown) for detecting the number of revolutions of the gas turbine 10, and an atmospheric temperature t2 measured by a sensor (not shown) for detecting the temperature of the atmosphere.

The deviation computing section 116 computes the deviation between the atmospheric temperature t2 and the target temperature TO to obtain a temperature difference dt (=TO−t2).

Figure 2A:
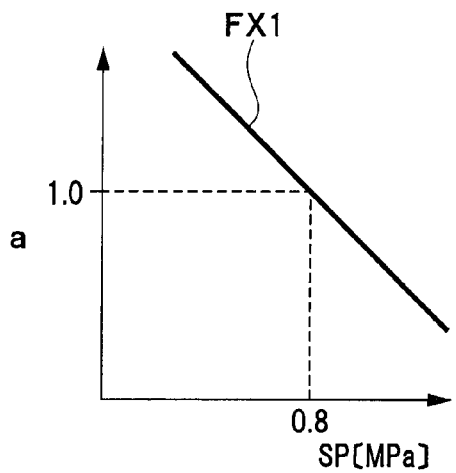
FIG. 2(a) to FIG. 2(e) are characteristics graphs showing function characteristics used in the embodiment.

The correction coefficient computing function section 111 has a correction coefficient computing function FX1 as shown in FIG. 2(a) and, when receiving the steam pressure SP, outputs a correction coefficient a corresponding to the inputted steam pressure SP with the use of the correction coefficient computing function FX1.

The correction coefficient computing function FX1 has function characteristics such that when the steam pressure SP increases, the correction coefficient a decreases. For example, when the steam pressure SP is a standard pressure (e.g., 0.8 [MPa]), the correction coefficient a having a value of 1 is outputted. When the steam pressure SP is lower than the standard pressure, the correction coefficient a having a value of higher than 1 is outputted. When the steam pressure SP is higher than the standard pressure, the correction coefficient a having a value of lower than 1 is outputted.

Figure 2B:
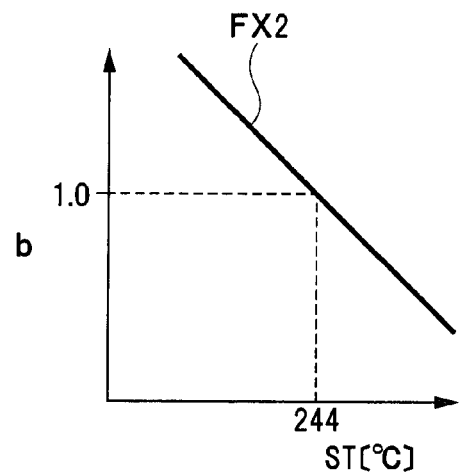

The correction coefficient computing function section 112 has a correction coefficient computing function FX2 as shown in FIG. 2(b) and, when receiving the steam temperature ST, outputs a correction coefficient b corresponding to the inputted steam temperature ST with the use of the correction coefficient computing function FX2.

The correction coefficient computing function FX2 has function characteristics such that when the steam temperature ST increases, the correction coefficient b decreases. For example, when the steam temperature ST is a standard temperature (e.g., 244° C.), the correction coefficient b having a value of 1 is outputted. When the steam temperature ST is lower than the standard temperature, the correction coefficient b having a value of higher than 1 is outputted. When the steam temperature ST is higher than the standard temperature, the correction coefficient b having a value of lower than 1 is outputted.

Figure 2C:
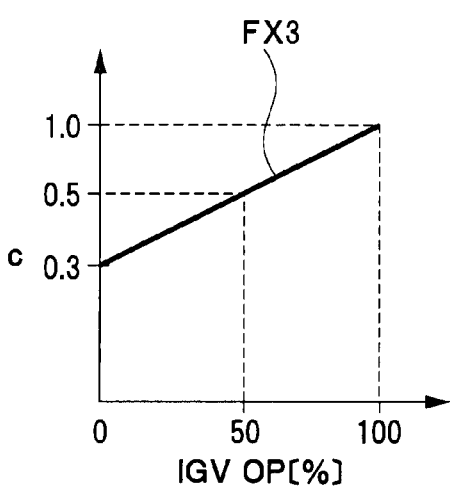

The correction coefficient computing function section 113 has a correction coefficient computing function FX3 as shown in FIG. 2(c) and, when receiving the IGV opening degree OP, outputs a correction coefficient c corresponding to the inputted IGV opening degree OP with the use of the correction coefficient computing function FX3.

The correction coefficient computing function FX3 has function characteristics such that when the IGV opening degree OP rises, the correction coefficient c increases. For example, when the IGV opening degree OP is 0%, the correction coefficient c having a value of 0.3 is outputted. When the IGV opening degree OP is 50%, the correction coefficient c having a value of 0.5 is outputted. When the IGV opening degree OP is 100%, the correction coefficient c having a value of 1.0 is outputted.

Figure 2D:
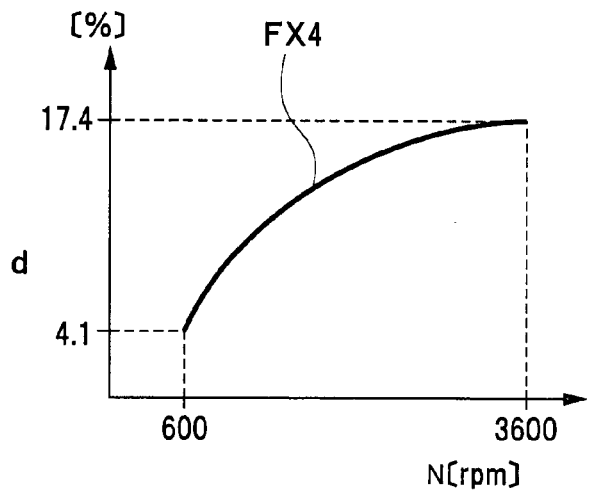

The valve opening degree command computing function section 114 has a valve opening degree command computing function FX4 as shown in FIG. 2(d) and, when receiving the gas turbine revolution number N, outputs an appropriate valve opening degree command d corresponding to the inputted gas turbine revolution number N with the use of the valve opening degree command computing function FX4.

The valve opening degree command computing function FX4 has function characteristics such that when the gas turbine revolution number N increases, the valve opening degree command d gradually increases. For example, when the gas turbine revolution number N is 600 [rpm], the valve opening degree command d having a value of 4.1% is outputted. When the gas turbine revolution number N is 3600 [rpm], the valve opening degree command d having a value of 17.4% is outputted.

Figure 2E:
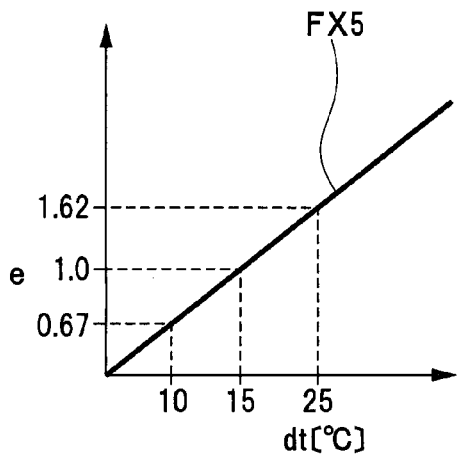
Figure 3:
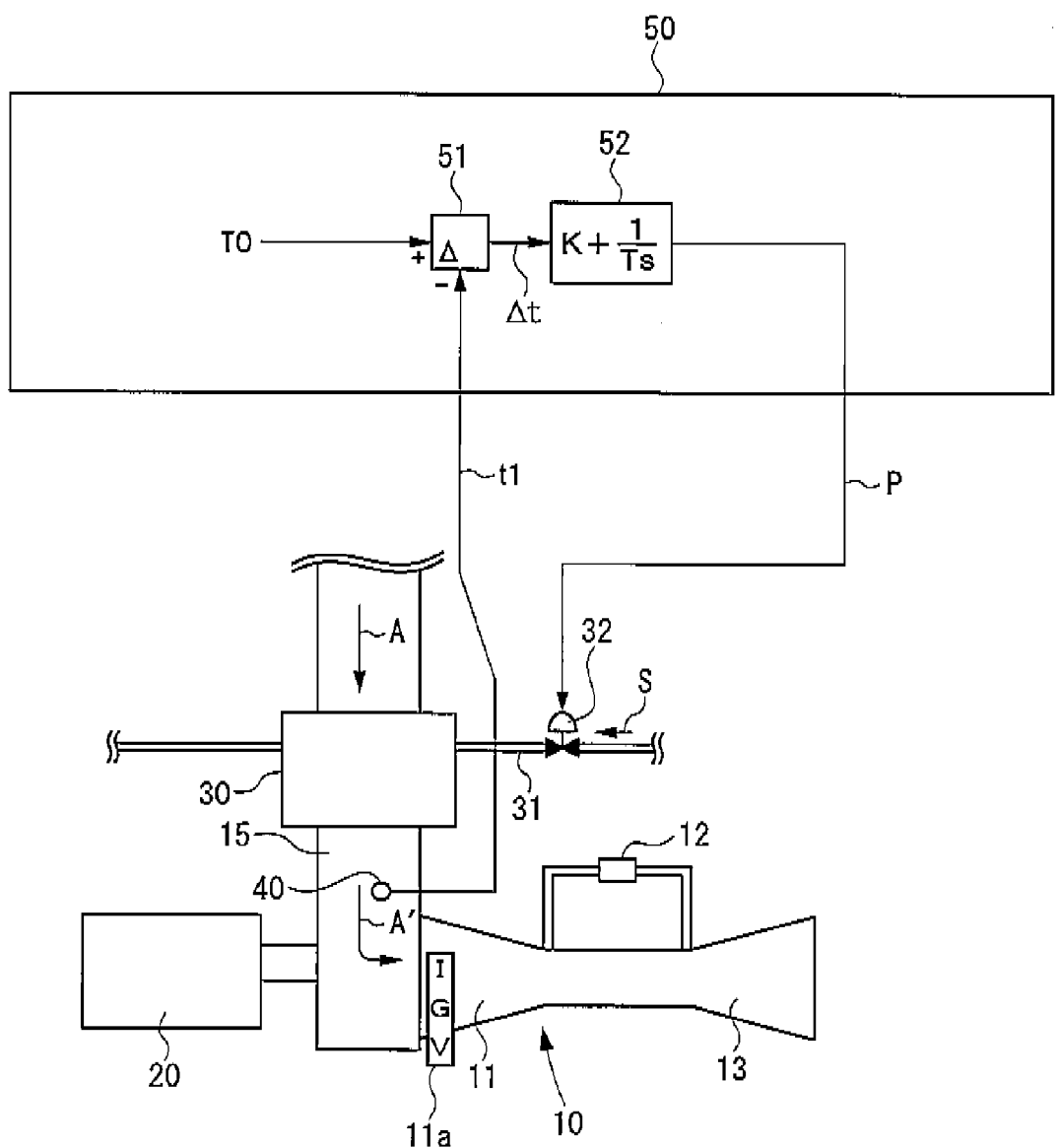
FIG. 3 is a configurational drawing showing a conventional technology.

The correction coefficient computing function section 115 has a correction coefficient computing function FX5 as shown in FIG. 2(e) and, when receiving the temperature difference dt, outputs a correction coefficient e corresponding to the inputted temperature difference dt with the use of the correction coefficient computing function FX5.

The correction coefficient computing function FX5 has function characteristics such that when the temperature difference dt increases, the correction coefficient e increases. For example, when the temperature difference dt is 10° C., the correction coefficient e having a value of 0.67 is outputted. When the temperature difference dt is 15° C., the correction coefficient e having a value of 1.0 is outputted. When the temperature difference dt is 25° C., the correction coefficient e having a value of 1.62 is outputted.

The multiplying section 117 multiplies the valve opening degree command d by all of the correction coefficients a, b, c and e, and outputs a valve opening degree prior command f. Further, the adding section 118 adds the valve opening degree prior command f to the valve opening degree PI correction command P outputted from the proportional plus integral computing section 102, and outputs a corrected valve opening degree command PA.

The control device 100 adjusts the valve opening degree of the control valve 32 according to the corrected valve opening degree command PA.

Thus, when the measured temperature t1 is low, the valve opening degree command P and the corrected valve opening degree command PA become great to render the valve opening degree of the control valve 32 great, thereby increasing the amount of steam to be supplied to the heat exchanger 30. When the measured temperature t1 is high, on the other hand, the valve opening degree PI correction command P and the corrected valve opening degree command PA become low to render the valve opening degree of the control valve 32 low, thereby decreasing the amount of steam to be supplied to the heat exchanger 30. This control performs the same control actions as those of the conventional feedback control.

Further, when the gas turbine revolution number N increases at the start of the gas turbine 10, the valve opening degree command d and the valve opening degree prior command f become great with the increase of the gas turbine revolution number N. As the gas turbine revolution number N increases, the corrected valve opening degree command PA also becomes great, heightening the opening degree of the control valve 32. Consequently, the amount of steam to be supplied to the heat exchanger 30 increases with the increase in the gas turbine revolution number N. This type of control is prior control (feedforward control).

As described above, the opening degree of the control valve 32 is raised priorly in accordance with the increase of the gas turbine revolution number N to increase the amount of steam to be supplied to the heat exchanger 30. Because of this prior control, even if the amount of intake air increases, at the start of the gas turbine 10, in accordance with the increase in the number of revolutions, the temperature of air A taken in can be maintained at the temperature ensuring stable combustion.

Moreover, when the IGV opening degree OP rises, the correction coefficient c and the valve opening degree prior command f become great with the rise in the IGV opening degree OP. As the IGV opening degree OP rises, the corrected valve opening degree command PA also becomes great, heightening the opening degree of the control valve 32. Consequently, the amount of steam to be supplied to the heat exchanger 30 increases with the heightening of the IGV opening degree OP. The type of control exercised here is prior control (feedforward control).

When the IGV opening degree OP lowers, on the other hand, the correction coefficient c and the valve opening degree prior command f become small with the lowering of the IGV opening degree OP. As the IGV opening degree OP lowers, the corrected valve opening degree command PA also becomes small, lowering the opening degree of the control valve 32. Consequently, the amount of steam to be supplied to the heat exchanger 30 decreases with the lowering of the IGV opening degree OP. This type of control is prior control (feedforward control).

As described above, the opening degree of the control valve 32 is raised priorly in accordance with the raise in the IGV opening degree OP to increase the amount of steam to be supplied to the heat exchanger 30. Because of this prior control, even if the amount of intake air abruptly increases as a result of the heightening of the opening degree of the IGV 11a, the temperature of air A' taken in can be maintained at the temperature ensuring stable combustion.

Furthermore, the opening degree of the control valve 32 is lowered priorly in accordance with the lowering of the IGV opening degree OP to decrease the amount of steam to be supplied to the heat exchanger 30. Because of this prior control, even if the amount of intake air abruptly decreases as a result of the lowering of the opening degree of the IGV 11a, the temperature of air A taken in can be maintained at the temperature ensuring stable combustion.

Moreover, when the atmospheric temperature t2 falls, the temperature difference dt increases. Thus, the correction coefficient e and the valve opening degree prior command f become great with the fall in the atmospheric temperature t2. As the atmospheric temperature t2 falls, the corrected valve opening degree command PA also becomes great, heightening the opening degree of the control valve 32. Consequently, the amount of steam to be supplied to the heat exchanger 30 increases with the fall in the atmospheric temperature t2. The type of control exercised here is prior control (feedforward control).

On the other hand, when the atmospheric temperature t2 rises, the temperature difference dt decreases. Thus, the correction coefficient e and the valve opening degree prior command f become small with the rises in the atmospheric temperature t2. As the atmospheric temperature t2 rises, the corrected valve opening degree command PA also becomes small, lowering the opening degree of the control valve 32. Consequently, the amount of steam to be supplied to the heat exchanger 30 decreases with the rise in the atmospheric temperature t2. The type of control exercised here is prior control (feedforward control).

As described above, the opening degree of the control valve 32 is controlled priorly in accordance with the rise or fall in the atmospheric temperature t2 to increase or decrease the amount of steam to be supplied to the heat exchanger 30. Thus, even if the atmospheric temperature t2 increases or decreases, the temperature of air A taken in can be maintained at the temperature ensuring stable combustion.

Moreover, when the steam pressure SP increases, the correction coefficient a and the valve opening degree prior command f become small with the increase in the steam pressure SP. As the steam pressure SP increases, the corrected valve opening degree command PA also lowers, lowering the opening degree of the control valve 32. Consequently, the amount of steam to be supplied to the heat exchanger 30 decreases with the increase in the steam pressure SP. The type of control exercised here is prior control (feedforward control).

On the other hand, when the steam pressure SP decreases, the correction coefficient a and the valve opening degree prior command f become great with the decrease in the steam pressure SP. As the steam pressure SP decreases, the corrected valve opening degree command PA also heightens, raising the opening degree of the control valve 32. Consequently, the amount of steam to be supplied to the heat exchanger 30 increases with the decrease in the steam pressure SP. The type of control exercised here is prior control (feedforward control).

As described above, the opening degree of the control valve 32 is controlled priorly in accordance with the increase or decrease in the steam pressure SP to increase or decrease the amount of steam to be supplied to the heat exchanger 30. Thus, even if the steam pressure SP increases or decreases, the temperature of air A taken in can be maintained at the temperature ensuring stable combustion.

Moreover, when the steam temperature ST increases, the correction coefficient b and the valve opening degree prior command f become small with the increase in the steam temperature ST. As the steam temperature ST increases, the corrected valve opening degree command PA also lowers, lowering the opening degree of the control valve 32. Consequently, the amount of steam to be supplied to the heat exchanger 30 decreases with the increase in the steam temperature ST. The type of control exercised here is prior control (feedforward control).

On the other hand, when the steam temperature ST decreases, the correction coefficient b and the valve opening degree prior command f become great with the decrease in the steam temperature ST. As the steam temperature ST decreases, the corrected valve opening degree command PA also becomes great, raising the opening degree of the control valve 32. Consequently, the amount of steam to be supplied to the heat exchanger 30 increases with the decrease in the steam temperature ST. The type of control exercised here is prior control (feedforward control).

As described above, the opening degree of the control valve 32 is controlled priorly in accordance with the increase or decrease in the steam temperature ST to increase or decrease the amount of steam to be supplied to the heat exchanger 30. Thus, even if the steam temperature ST increases or decreases, the temperature of air A' taken in can be maintained at the temperature ensuring stable combustion.

When the temperature and pressure of steam S are stable, it is permissible not to use the correction coefficient computing function sections 111, 112.

In a district where the atmospheric temperature t2 does not abruptly change, moreover, it is permissible not to use the deviation computing section 116 and the correction coefficient computing function section 115.

The invention claimed is:
1. An intake air heating control device for a gas turbine, comprising:
    a heat exchanger for heating air, which is taken into the gas turbine, by a heating medium;
    a control valve for controlling an amount of the heating medium, which is supplied to the heat exchanger, by having a valve opening degree thereof controlled;
    a thermometer for measuring a temperature of air which has been heated by the heat exchanger and is taken into the gas turbine; and a control device for controlling the valve opening degree of the control valve so that a measured temperature measured by the thermometer becomes a preset target temperature, characterized in that the control device comprises a deviation computing section for obtaining a deviation temperature being a deviation between the target temperature and the measured temperature, and a proportional plus integral computing section for performing proportional plus integral computation of the deviation temperature to obtain a valve opening degree PI correction command P, a valve opening degree command computing function section for outputting a valve opening degree command whose value increases when a number of revolutions of the gas turbine increases, an inlet guide vane correction coefficient computing function section for outputting an inlet guide vane correction coefficient whose coefficient value increases when an opening degree of an inlet guide vane of the gas turbine heightens, a multiplying section for multiplying the valve opening degree command by the inlet guide vane correction coefficient, and outputting a valve opening degree prior command, and an adding section for adding the valve opening degree prior command to the valve opening degree PI correction command, and outputting a corrected valve opening degree command, and controls the valve opening degree of the control valve in accordance with a magnitude of the corrected valve opening degree command.

2. An intake air heating control device for a gas turbine, comprising:

a heat exchanger for heating air, which is taken into the gas turbine, by a heating medium;

a control valve for controlling an amount of the heating medium, which is supplied to the heat exchanger, by having a valve opening degree thereof controlled;

a thermometer for measuring a temperature of air which has been heated by the heat exchanger and is taken into the gas turbine; and a control device for controlling the valve opening degree of the control valve so that a measured temperature measured by the thermometer becomes a preset target temperature, characterized in that the control device comprises a deviation computing section for obtaining a deviation temperature being a deviation between the target temperature and the measured temperature, and a proportional plus integral computing section for performing proportional plus integral computation of the deviation temperature to obtain a valve opening degree PI correction command P, a second deviation computing section for obtaining a temperature difference between the target temperature and atmospheric temperature, a valve opening degree command computing function section for outputting a valve opening degree command whose value increases when a number of revolutions of the gas turbine increases, an inlet guide vane correction coefficient computing function section for outputting an inlet guide vane correction coefficient whose coefficient value increases when an opening degree of an inlet guide vane of the gas turbine heightens, a temperature difference correction coefficient computing function section for outputting a temperature difference correction coefficient whose coefficient value increases when the temperature difference increases, a multiplying section for multiplying the valve opening degree command by the inlet guide vane correction coefficient and the temperature difference correction coefficient, and outputting a valve opening degree prior command, and an adding section for adding the valve opening degree prior command to the valve opening degree PI correction command, and outputting a corrected valve opening degree command, and controls the valve opening degree of the control valve in accordance with a magnitude of the corrected valve opening degree command.

3. An intake air heating control device for a gas turbine, comprising:

a heat exchanger for heating air, which is taken into the gas turbine, by a heating medium;

a control valve for controlling an amount of the heating medium, which is supplied to the heat exchanger, by having a valve opening degree thereof controlled;

a thermometer for measuring a temperature of air which has been heated by the heat exchanger and is taken into the gas turbine; and a control device for controlling the valve opening degree of the control valve so that a measured temperature measured by the thermometer becomes a preset target temperature, characterized in that the control device comprises a deviation computing section for obtaining a deviation temperature being a deviation between the target temperature and the measured temperature, and a proportional plus integral computing section for performing proportional plus integral computation of the deviation temperature to obtain a valve opening degree PI correction command P, a second deviation computing section for obtaining a temperature difference between the target temperature and atmospheric temperature, a valve opening degree command computing function section for outputting a valve opening degree command whose value increases when a number of revolutions of the gas turbine increases, an inlet guide vane correction coefficient computing function section for outputting an inlet guide vane correction coefficient whose coefficient value increases when an opening degree of an inlet guide vane of the gas turbine heightens, a temperature difference correction coefficient computing function section for outputting a temperature difference correction coefficient whose coefficient value increases when the temperature difference increases, a heating medium pressure correction coefficient computing function section for outputting a heating medium pressure correction coefficient whose coefficient value becomes 1 when a pressure of the heating medium to be supplied to the heat exchanger is equal to a preset reference pressure, whose coefficient value becomes smaller than 1 when the pressure of the heating medium to be supplied to the heat exchanger is higher than the reference pressure, and whose coefficient value becomes larger than 1 when the pressure of the heating medium to be supplied to the heat exchanger is lower than the reference pressure, a heating medium temperature correction coefficient computing function section for outputting a heating medium temperature correction coefficient whose coefficient value becomes 1 when a temperature of the heating medium to be supplied to the heat exchanger is equal to a preset reference temperature, whose coefficient value becomes smaller than 1 when the temperature of the heating medium to be supplied to the heat exchanger is higher than the reference temperature, and whose coefficient value becomes larger than 1 when the temperature of the heating medium to be supplied to the heat exchanger is lower than the reference temperature, a multiplying section for multiplying the valve opening degree command by the inlet guide vane correction coefficient, the temperature difference correction coefficient, the heating medium pressure correction coefficient, and the heating medium temperature correction coefficient, and outputting a valve opening degree prior command, and an adding section for adding the valve opening degree prior command to the valve opening degree PI correction command, and outputting a corrected valve opening degree command, and controls the valve opening degree of the control valve in accordance with a magnitude of the corrected valve opening degree command.

* * * * *